United States Patent [19]
Swenson et al.

[11] Patent Number: 6,064,380
[45] Date of Patent: *May 16, 2000

[54] BOOKMARK FOR MULTI-MEDIA CONTENT

[75] Inventors: Michelle Denise Swenson, Leander; Edmund Troche, Austin, both of Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/971,778

[22] Filed: Nov. 17, 1997

[51] Int. Cl.⁷ .............................. G06F 13/00; H04N 7/14
[52] U.S. Cl. ............................... 345/328; 345/327; 348/7
[58] Field of Search .................... 345/327, 328, 345/302; 348/7

[56] References Cited

U.S. PATENT DOCUMENTS

| | | | |
|---|---|---|---|
| 4,682,248 | 7/1987 | Schwartz | 360/32 |
| 4,755,889 | 7/1988 | Schwartz | 360/32 |
| 5,500,929 | 3/1996 | Dickinson | 395/160 |
| 5,517,605 | 5/1996 | Wolf | 395/155 |
| 5,530,859 | 6/1996 | Tobias, II et al. | 395/650 |
| 5,535,063 | 7/1996 | Lamming | 360/4 |
| 5,553,281 | 9/1996 | Brown et al. | 395/600 |
| 5,555,244 | 9/1996 | Gupta et al. | 370/60.1 |
| 5,568,167 | 10/1996 | Galbi et al. | 348/589 |
| 5,572,625 | 11/1996 | Raman et al. | 395/2.69 |
| 5,572,643 | 11/1996 | Judson | 395/793 |
| 5,603,012 | 2/1997 | Sotheran | 395/500 |
| 5,606,358 | 2/1997 | Youden et al. | 348/7 |
| 5,692,213 | 11/1997 | Goldberg et al. | 395/806 |
| 5,729,279 | 3/1998 | Fuller | 348/8 |
| 5,737,619 | 4/1998 | Judson | 395/761 |
| 5,745,782 | 4/1998 | Conway | 395/806 |
| 5,761,485 | 6/1998 | Munyan | 395/500 |
| 5,983,236 | 11/1999 | Yager et al. | 707/104 |

OTHER PUBLICATIONS

Steinberg, Gene; Using America Online Third Edition, Que Corporation, pp. 199–206, 1996.

*Primary Examiner*—Raymond J. Bayerl
*Assistant Examiner*—David E. Brown
*Attorney, Agent, or Firm*—Robert V. Wilder; Leslie A. VanLeeuwen

[57] ABSTRACT

A method and implementing network computer system is provided in which completion point file positions of multi-media file presentations may be saved in persistent memory devices when a user desires to terminate a multimedia file being presented on a display device. In subsequent network and multimedia file accesses, a user is selectively able to begin play at the previously saved completion point in the multimedia file presentation, i.e. the file position at which the user had previously terminated play. The saved position in one example may include a refresh rewind of a predetermined length from the saved position to refresh a user with the content of the multimedia file being continued. In an exemplary embodiment, a user is also presented with a selection device by which the user may create a title for one or more saved files and corresponding completion points within each saved file. A default file designation may be automatically entered by the program. A plurality of partially presented multimedia files may be saved and listed for subsequent continuation from the point of previous termination.

19 Claims, 3 Drawing Sheets

BOOKMARK FOR MULTI-MEDIA CONTENT

FIELD OF THE INVENTION

The present invention relates generally to information processing systems and more particularly to a methodology and implementation for network multimedia file processing.

BACKGROUND OF THE INVENTION

In network computer systems, a plurality of computers are connected together and one or more of the computers generally performs the function of a network server. A network may be established through the hard-wired interconnection of a plurality of computer terminals in a local network or on a wider scale such as the Internet or world wide web which may include telecommunication links. In any case, the network server acts as the central control unit for providing access to files, programs and program execution to the individual computers connected within the network. In general, a networked computer terminal will "logon" to the network and obtain access to a network server. The network server will download a homepage presentation on the user's terminal which may include and audio and video effects. From the initial screen display, a user may designate any other "address" to get to another "location" or screen display. The user may also select from a plurality of functions which may be presented for user selection on the initial display.

Generally, almost all screen displays include designated selection areas on the screen where the user may point a selection device such as a mouse-controlled pointer, and "click" on the designated screen area to invoke a displayed function, or menu for other function selection options. When the homepage or selection screen is downloaded from the server, many small programs or "applets" are also downloaded at the same time to the user's terminal memory. Those applets are associated with different ones of the designated screen selection areas and are executed when a user makes a selection or clicks on one of the selection areas on the display. The applets, in turn, may call for the presentation of a new user interface screen, or a new or different section of a portion of the screen, such as a pop-up menu or other graphical user interface (GUI) which may be within a framed or windowed sub-section of the main homepage.

The GUI presentation is typically designed and customized to present an attractive display and facilitate use of the computer interface by a user in making subsequent selections or executing selected functional aspects associated with the GUI presentation. The GUI display is typically displayed as the end result of the execution of a program downloaded from the server in response to the user selection of a designated screen area. The design and display of the GUI screen is typically determined in advance and "hard-coded" by a programmer.

In modern networks, the availability and use of multimedia files is increasing. Multimedia files include, inter alia, audio files and video files. Typically, a user may select or "click-on" a graphic or hypertext area on a selection screen to have the selected audio or video file presented at the user terminal by a player device. The present example will demonstrate the disclosed methodology relative to a video file although it is understood that corresponding methodology also applies to audio and other multimedia file presentations. Multimedia files are of varying length and may require from seconds to hours or longer to play through to the end of the file. When a user initiates the playing of a video file for example, and then at a later point in time, while the video is still playing, wishes to pause the presentation, the user may select and invoke a "pause" function. Later, when the video is to resume, the user may select and invoke a resume function. However, if the user needed to logoff the network before the video had completed playing, or if the system needed to be shut-down for any reason, the video file would have to be re-played from the beginning of the file after the next log-on by the user. In view of the availability of longer video files from servers in networks, that process is often inefficient and cumbersome.

Thus, there is a need for an improved multimedia file presentation methodology which is effective to facilitate and accommodate frequent multimedia file accesses directly to previous points of departure from multimedia file presentations without requiring a serial playback from the beginning of the particular multimedia file. There is a further need to provide a means by which a specific file position may be subsequently accessed directly, even after a network disconnect or a user terminal shut-down.

SUMMARY OF THE INVENTION

A method and implementing computer system is provided in which completion point file positions of multimedia file presentations may be saved in persistent memory devices when a user desires to terminate a multimedia file being presented on a display device. In subsequent network and multimedia file accesses, a user is selectively able to begin play at the previously saved completion point in the multimedia file presentation, i.e. the file position at which the user had previously terminated play. The saved position in one example may include a refresh rewind of a predetermined length from the saved position to refresh a user with the content of the multimedia file being continued. In an exemplary embodiment, a user is also presented with a selection device by which the user may create a title for one or more saved files and corresponding completion points within each saved file. A plurality of partially presented multimedia files may be saved and listed for subsequent continuation from the point of previous termination.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
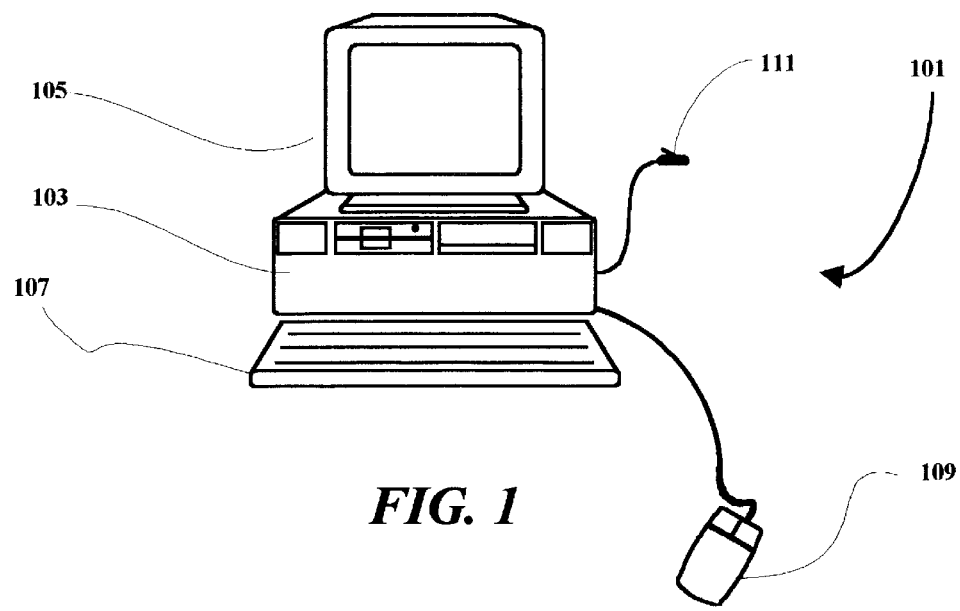
FIG. 1 is a diagram of a computer system in which the present invention may be implemented.

With reference to FIG. 1, the various methods discussed herein may be implemented within a computer network including a computer terminal 101, which may comprise either a workstation or a PC (personal computer) for example. In general, an implementing computer system may include computers configured with a plurality of processors in a multi-bus system in a network of similar systems. However, since the workstation or computer terminal 101 implementing the present invention in the example, is generally known in the art and composed of electronic components and circuits which are also generally known to those skilled in the art, circuit details beyond those shown in FIG. 1, are not specified to any greater extent than that considered necessary as illustrated, for the understanding and appreciation of the underlying concepts of the present invention and in order not to obfuscate or distract from the teachings of the present invention.

In FIG. 1, the computer system includes a processor unit 103 which is typically arranged for housing a processor circuit along with other component devices and subsystems of the computer terminal 101. The computer terminal 101 also includes a monitor unit 105, a keyboard 107 and a mouse or pointing device 109, which are all interconnected with the computer terminal illustrated. Also shown is a connector 111 which is arranged for connecting a modem within the computer terminal to a communication line such as a telephone line in the present example. The present invention may also be implemented in a cellular system.

Figure 2:
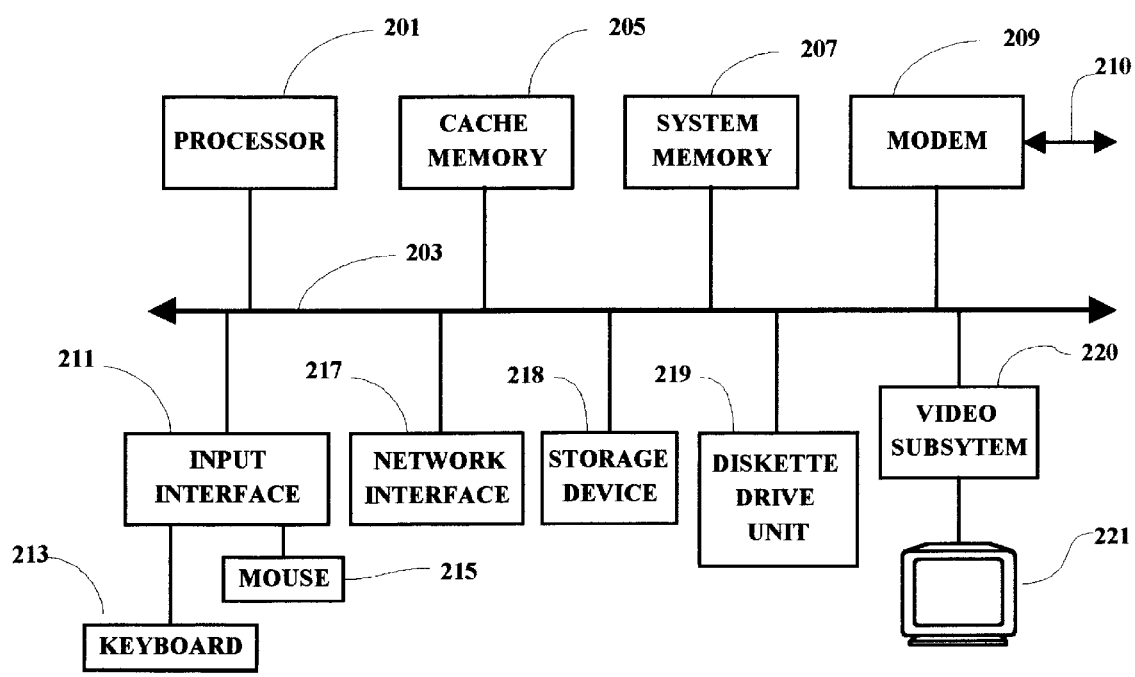
FIG. 2 is a simplified schematic diagram showing selected components and subsystems of the computer system illustrated in FIG. 1.

Several of the major components of the terminal 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit are also connected to the bus 203. A modem 209 is arranged for connection 210 to a communication line, such as a telephone line, through a connector 111 (FIG. 1). The modem 209, in the present example, selectively enables the computer terminal 101 to establish a communication link and initiate communication with network server, such as the Internet.

The system bus 203 is also connected through an input interface circuit 211 to a keyboard 213 and a mouse or pointing device 215. The bus 203 may also be coupled through a hard-wired network interface subsystem 217. A diskette drive unit 219 is also shown as being coupled to the bus 203. A video subsystem 220, which may include a graphics subsystem, is connected to a display device 221. A storage device 218, which may comprise a hard drive unit, is also coupled to the bus 203. The diskette drive unit provides a means by which individual diskette programs may be loaded on to the hard drive, or accessed directly, for selective execution by the computer terminal 101. As is well known, program diskettes containing application programs represented by magnetic indicia on the diskette, may be read from the diskette drive, and the computer system is selectively operable to read such magnetic indicia and create program signals. Such program signals are selectively effective to cause the computer system to present displays on the screen of a display device and respond to user inputs in accordance with the functional flow of the application program on the diskette.

In running an Internet access program or browser program on the computer terminal 101, the access program is typically stored in the storage device 218 and either selectively or automatically, partially or totally, loaded into the system memory 207 when the system is initially powered-on, or at a later time if so desired by a user. The browser is selectively operable to access and execute a site selection program, as herein described, either directly from a diskette in the diskette drive unit 219 or directly from a copy of the site selection program stored on the hard drive unit 218. As a program is running, either a portion of the program or the entire program may be loaded into the system memory 207 and/or the system cache memory 205. Depending on specific program design, the system may store any information accessed from a database in the storage unit 218, the cache memory 205, the system memory 207 or directly from a diskette loaded into the diskette drive 219. Assuming a user has started-up the system, and is actively running a browser program for example, from memory, a series of screens will be displayed to the user on the display device 221. Each screen typically has one or more selections for the user to make in navigating through the program. In general, a user will make selections from a home page display screen using the keyboard 213 or the mouse or pointer device 215. In an Internet operating program, the selections made by the user will determine "where" the user "goes", i.e. to what "site" or "webpage", and also, in some cases, the communications link or the path taken to get to the site selected.

Figure 3:
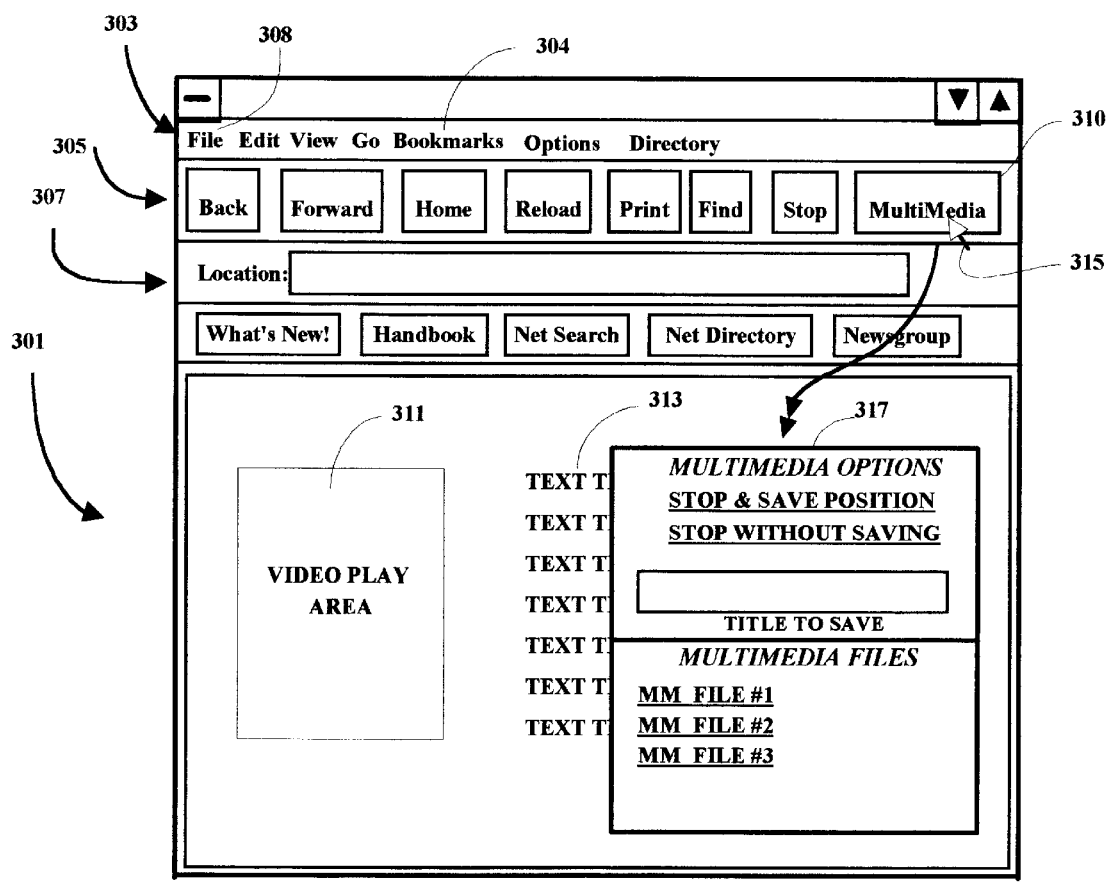
FIG. 3 is an illustration of an exemplary display screen of a typical network or web page for reference in explaining the present invention.

FIG. 3 illustrates a typical program screen display 301 in an Internet operating session. The browser screen generally includes a "mode" row 303 which displays several different operational modes or menus which the user may select such as the "File" selection 308 and the "Bookmarks" selection 304. Another row 305 may be displayed to help a user quickly move through documents, sites, or pages in a network application. An address or "location" section 307 enables a user to key-in, and also displays the name of, an internet address of a site to be, or being, visited. The location or URL (Uniform Resource Locator) designation may be keyed into the location field 307 or clicked on by means of an icon from a previous page. Other quick access buttons may be implemented on the screen for quick access to other selected network services and/or network functions such as "What's New" or "Net Search". In general, any of the illustrated items may be selected through a "point and click" methodology associated with the mouse device 215, and a cursor or pointer 315 visible on the display screen. For example, a download of data from a remote site may be immediately terminated during the transmission by pointing to the "Stop" button and clicking on a designated mouse button. Similarly, the "Back" and "Forward" buttons may be used to return to the last screen display or go forward to the next screen display, respectively.

In the FIG. 3, there is also shown a video play area 311 on the display screen. The video play area 311 represents a screen area in which video files may be played or presented. The screen area could be smaller or larger than the area illustrated. There is also illustrated a text area 313 which may be included to present text associated with the video or other text not necessarily associated with a video file being presented. There may also be an audio file being presented over an audio system (not shown) and related to the video presentation. As illustrated, a multimedia function button 310 is also included in the exemplary display screen. When the multimedia button 310 is pointed to by a cursor 315 for example, and selected by a user, the multimedia menu 317 is presented. The multimedia menu 317 in the present example, includes a "Multimedia Options" section and a "Multimedia Files" section. By pointing and clicking with an associated mouse device 109, a user is able to chose a "Stop & Save Position" hypertext selection or a "Stop Without Saving" hypertext selection from the menu in the present example.

If a user clicks on the "Stop Without Saving" selection, any video or multimedia file being played will be stopped and the program will not save the position at which the file was stopped. However, if a user click on the "Stop & Save Position" button, the file being played will be stopped and the position at which the file was stopped will be saved to persistent memory such the user's disk drive or in a data file associated with the user's browser program and stored on the user's hard drive. The position at which the multimedia presentation was terminated may also be transferred to the server or other persistent memory location for storage in persistent memory associated with the multimedia file or with other user data. A user may also selectively designate a custom name for the saved file by inputting in the "Title To Save" input area on the display screen. In any case, the position in the multimedia file at which the presentation was stopped represents the position at which a subsequent request to play the particular multimedia file will be initiated. The subsequent start position may also include a rewind of a predetermined or selectable length from the previously terminated position in order to refresh the user with the latter portion of the previously viewed video or other multimedia file. The saved "Title", along with other and previously saved files and file segments, may be listed in the "Multimedia Files" section of the screen display as in a typical "bookmark" function. A user may select one of the multimedia files from the "Multimedia Files" screen area to initiate the playing of the selected multimedia file from the previously saved position at which the file was last terminated.

Figure 4:
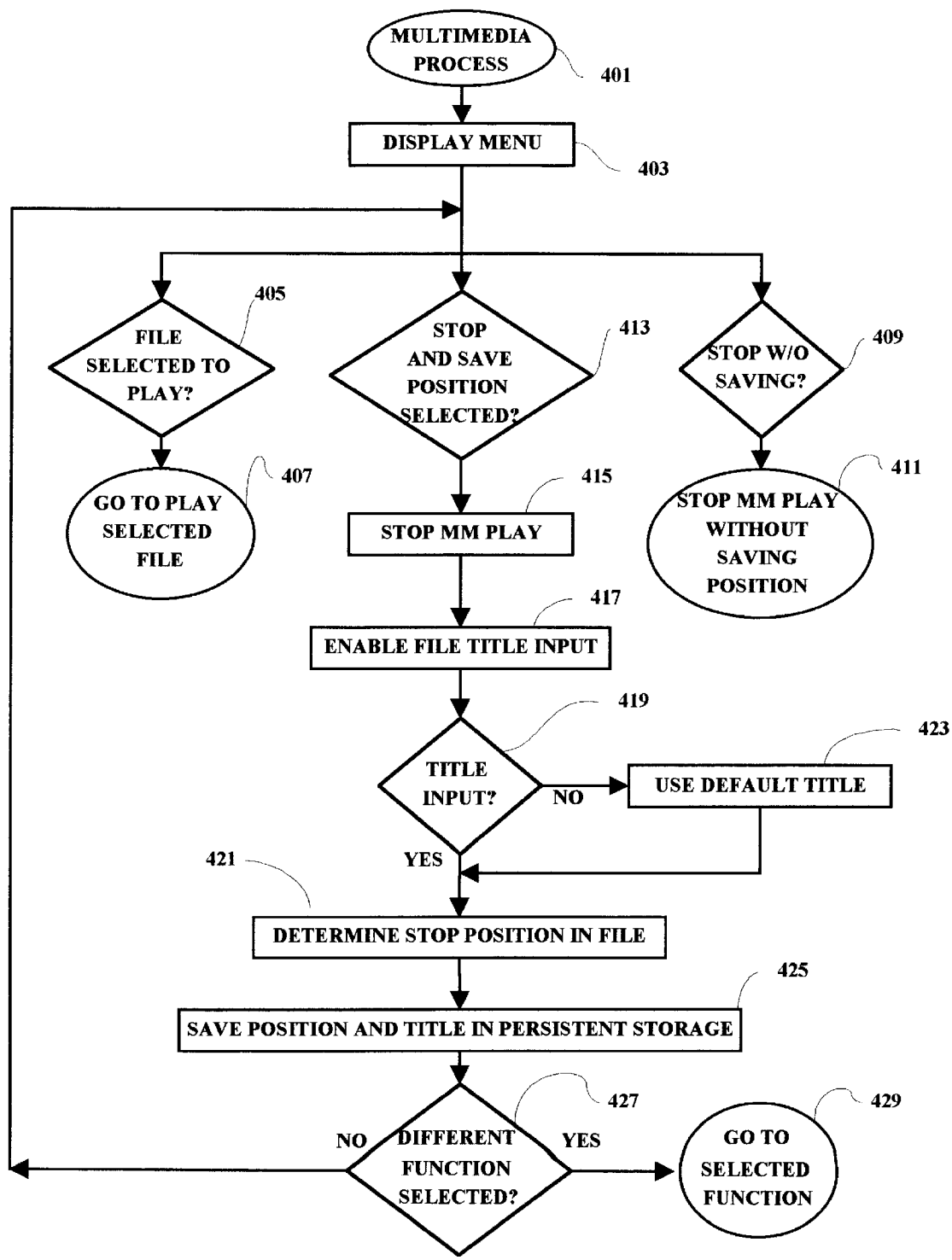
FIG. 4 is a flow chart illustrating an exemplary embodiment of one methodology effective to implement the disclosed processing system.

In FIG. 4, an exemplary flow for the disclosed methodology is illustrated. In the multimedia function 401, when the multimedia menu 317 is displayed 403, a user is presented with a choice of selections as hereinbefore noted. A user may select a file 405 from those listed in the multimedia files section of the display, in which case the program would go 407 to a play routine to play the selected multimedia file. A user may also select to "Stop Without Saving" 409 in which case a multimedia file being played will be terminated 411 and the position within the file at which the play was terminated will not be saved. If a user clicks on the "Stop And Save Position" selection 413, the program will stop 415 the multimedia file being played and prompt a user to enter a title 419 for the saved file and file position at which the file play was terminated. If no title input is made 419, the program may enter a default designation 423 which may be made in accordance with a predetermined routine and include such information as an identifier for the particular multimedia file being terminated and a date for example.

Next, the position of the multimedia file at which the presentation was terminated is determined 421 and that position is saved in persistent memory or storage 425. The position may be determined in terms of byte position or time position or other criterion, but in any case, the position indicia stored will be sufficient to efficiently return to the position within the multimedia file at which the play was terminated. Since the position is saved in persistent memory of some type, the saved position will be available for later access even if the network connection is terminated or the user system is shut down. After the position is saved 425, the user may select a different function 427 at which time the program will go to the selected function 429. Until a different function is selected, the multimedia menu will continue to be displayed 403. The steps illustrated in the example are for illustration only and the scope and the sequence of the steps may vary and still provide the benefit of the various functions and combination of functions described herein.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing multimedia file presentations in a network, said method comprising:

transmitting a first multimedia file from a server to a user terminal;

playing said first multimedia file at said user terminal as said first multimedia file is received from said server;

receiving a terminate command input from said user terminal for terminating said transmitting of said first multimedia file;

determining a terminate position within said first multimedia file at which said terminate command input is received;

presenting an input display at said user terminal to enable a user to provide input indicia to be associated with said first multimedia file and said terminate position within said first multimedia file;

associating said input indicia with said terminate position and said first multimedia file; and saving first multimedia file indicia, said first multimedia file indicia including a first multimedia file identification along with said input indicia and said terminate position, said first multimedia file indicia being saved in a persistent memory device connected within said network.

2. The method as set forth in claim 1 and further including:

receiving a multimedia presentation request command from a user; and presenting a listing of multimedia file designations on a user display, said multimedia file designations including said first multimedia file indicia.

3. The method as set forth in claim 2 and further including:

enabling the user to choose a selected one of said multimedia files to be played at the user display; and transferring said selected one of said multimedia files to the user display, said transferring being accomplished beginning at a position in said first multimedia file relatively close to said terminate position if said selected one of said multimedia files comprises said first multimedia file indicia.

4. The method as set forth in claim 3 wherein said transferring is accomplished beginning at said terminate position in said first multimedia file.

5. The method as set forth in claim 3 wherein said transferring is accomplished beginning at a point which is located at a predetermined increment prior to said terminate position in said first multimedia file.

6. The method as set forth in claim 1 wherein said terminate position is representative of a relative byte position within said first multimedia file.

7. The method as set forth in claim 1 wherein said terminate position is representative of a relative time position within said first multimedia file.

8. The method as set forth in claim 1 wherein said network includes at least one server device and a user terminal, and said persistent memory device is connected to said user terminal.

9. The method as set forth in claim 8 wherein said persistent memory device comprises a disk drive device.

10. The method as set forth in claim 9 wherein said disk drive device is a magnetic disk drive device.

11. The method as set forth in claim 9 wherein said disk drive device is an optical disk drive device.

12. The method as set forth in claim 1 wherein said network includes at least one server device and a user terminal, and said persistent memory device is connected to said server device.

13. The method as set forth in claim 12 wherein said persistent memory device comprises a disk drive device.

14. The method as set forth in claim 13 wherein said disk drive device is a magnetic disk drive device.

15. The method as set forth in claim 13 wherein said disk drive device is an optical disk drive device.

16. A network server comprising:

means for transmitting a first multimedia file from said network server to a user terminal, said user terminal being operable to receive said first multimedia file, said user terminal being further effective for playing said first multimedia file at said user terminal as said multimedia file is being received from said network server;

said network server being arranged for receiving a terminate command input from a user for terminating said transmitting of said first multimedia file;

means for determining a terminate position within said first multimedia file at which said terminate command input is received;

means for presenting an input display at said user terminal to enable a user to provide input indicia to be associated with said first multimedia file and said terminate position within said first multimedia file;

associating said input indicia with said terminate position and said first multimedia file; and persistent memory means connected to said network server, said server being effective for saving first multimedia file indicia in said persistent memory means, said first multimedia file indicia including a first multimedia file identification along with said input indicia and said terminate position.

17. The network server as set forth in claim 16 wherein said first multimedia file indicia is stored in a first terminated position file created by said server, said user terminal being selectively operable in response to a subsequent request from the user for enabling the user to input a selection of said first multimedia file indicia, said server being responsive to said selection for initiating a playing of said first multimedia file beginning in close proximity to said terminate position.

18. A network user terminal device comprising:

receiving means for receiving a transmission of a first multimedia file from a network server;

display means operable for playing said first multimedia file on said display means as said multimedia file is being received from said network server;

said network user terminal device being arranged for transferring a terminate command input signal from a user to said network server, said terminate command input signal being operable for terminating said transmission of said first multimedia file;

means for determining a terminate position within said first multimedia file at which said terminate command input is generated;

means for presenting an input display at said display means to enable a user to provide input indicia to be associated with said first multimedia file and said terminate position within said first multimedia file;

associating said input indicia with said terminate position and said first multimedia file; and persistent memory means connected to said network user terminal device for saving first multimedia file indicia in said persistent memory means, said first multimedia file indicia including a first multimedia file identification along with said input indicia and said terminate position.

19. The network user terminal device as set forth in claim 18 wherein said first multimedia file indicia is stored in a first terminated position file designated by said user, said user terminal being selectively operable in response to a subsequent request from the user for enabling the user to input a selection of said first multimedia file indicia, said user terminal device being selectively operable in response to said file selection for initiating a playing of said first multimedia file beginning in close proximity to said terminate position.

\* \* \* \* \*